United States Patent [19]

Shallenberger et al.

[11] Patent Number: 4,638,543
[45] Date of Patent: Jan. 27, 1987

[54] LOCKING TUBE REMOVAL FIXTURE AND METHOD IN A RECONSTITUTABLE FUEL ASSEMBLY

[75] Inventors: John M. Shallenberger, Fox Chapel; Stephen J. Ferlan, Wilkins Township, Allegheny County, both of Pa.

[73] Assignee: Westinghouse Electric Corp., Pittsburgh, Pa.

[21] Appl. No.: 695,762

[22] Filed: Jan. 28, 1985

[51] Int. Cl.⁴ .................. B23P 19/00; B23P 17/00; B23Q 13/14
[52] U.S. Cl. ........................ 29/426.5; 29/400 N; 29/723; 269/48.1
[58] Field of Search ............... 29/157.3 C, 282, 281.4, 29/723, 426.5, 400 N; 269/48.1

[56] References Cited

U.S. PATENT DOCUMENTS

| | | | |
|---|---|---|---|
| 3,835,520 | 9/1974 | Sismore | 29/157.3 C |
| 3,986,383 | 10/1976 | Petteys | 269/48.1 |
| 4,065,953 | 1/1978 | Frentzen et al. | 269/48.1 |
| 4,506,442 | 3/1985 | Alzmann et al. | 29/464 |

*Primary Examiner*—Howard N. Goldberg
*Assistant Examiner*—S. Nichols

[57] ABSTRACT

A fixture for removing locking tubes from locking positions in a top nozzle includes a tool guide and a tool holder mounted above the tool guide for movement toward and away from the guide. Further, the fixture includes locking member removal tools each in the form of an outer elongated tubular member and an inner elongated actuating shaft. The tubular member is attached to the tool guide in alignment with one of its openings, while the actuating shaft is mounted to the tool holder and extends through the tubular member. When the tool guide is disposed on the top nozzle, both the tubular member and actuating shaft of each removal tool extend downwardly through one locking tube. The lower portion of the tubular member is in the form of a segmented sleeve having a lower segmented rim which is movable between circumferentially-collapsed and expanded positions. The actuating shaft of each tool has an upper cylindrical portion with an outside diameter larger than the inside diameter of the locking tube. Consequently, insertion of the upper shaft portion into the lower segmented sleeve of the tubular member upon predetermined movement of the tool holder relative to the tool guide causes the sleeve rim of each removal tool tubular member to assume its expanded position in which it engages the lower end of one of the locking tubes. Then, withdrawal of the tool guide and tool holder results in removal of the locking tubes therefrom also.

11 Claims, 7 Drawing Figures

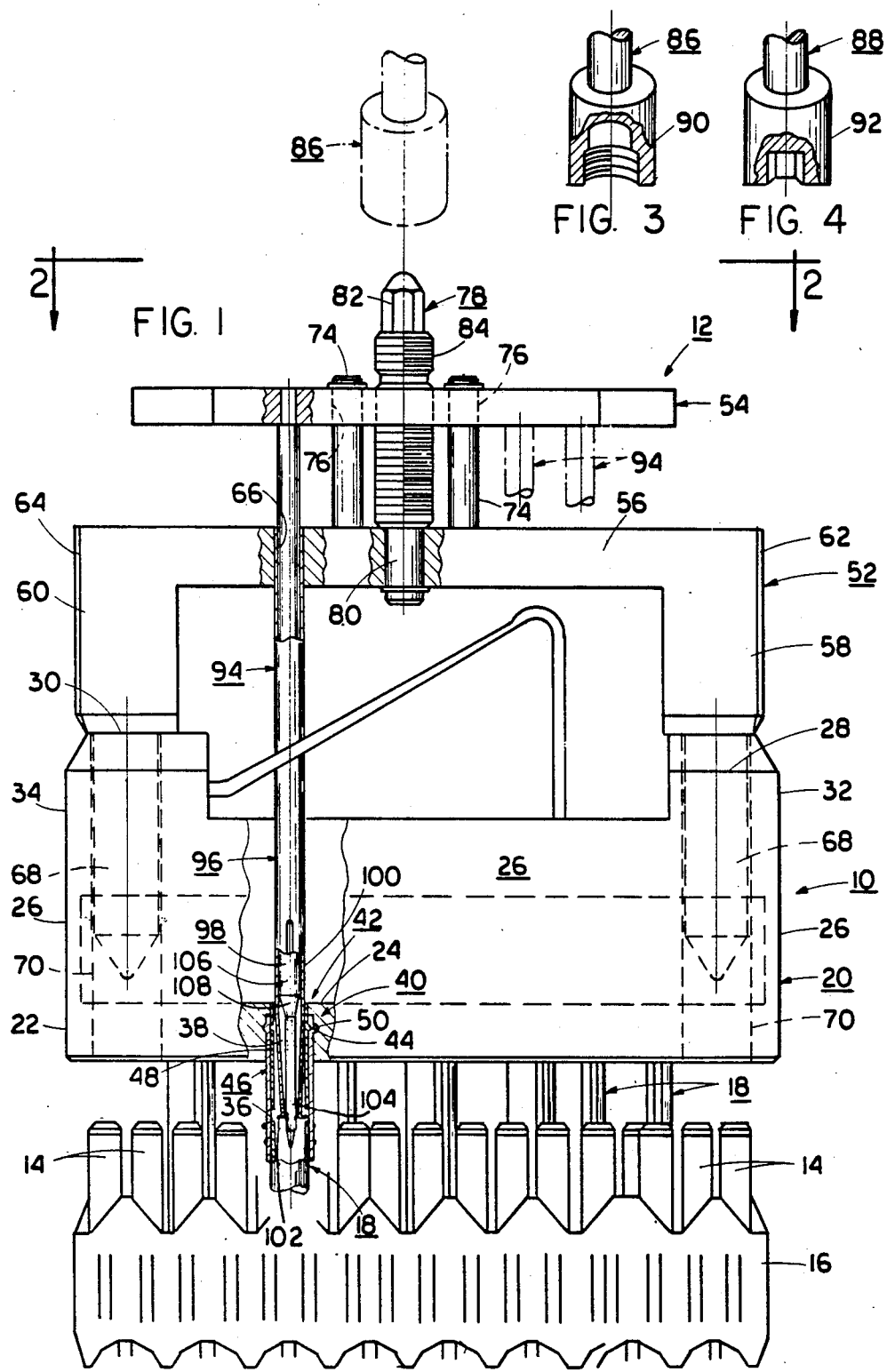

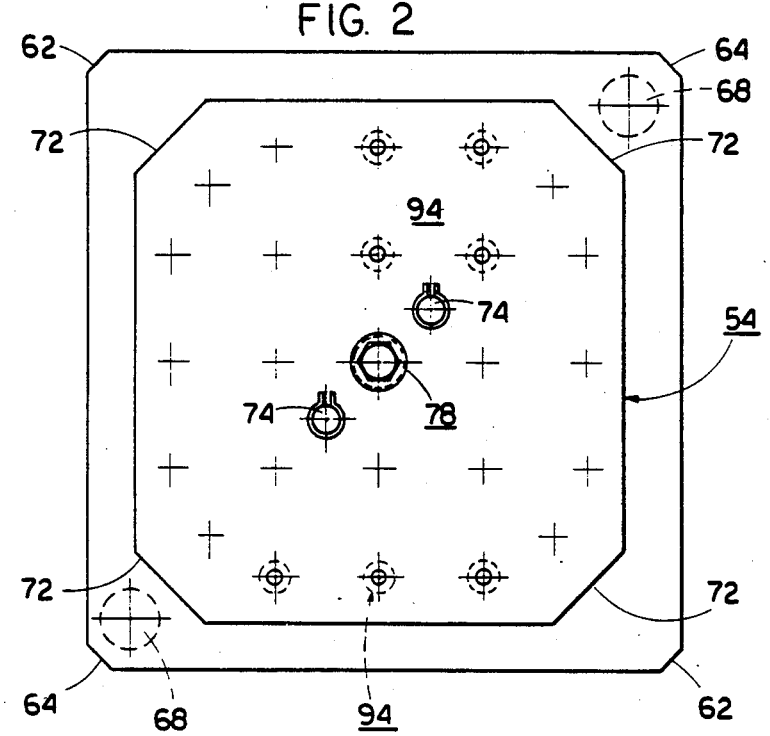
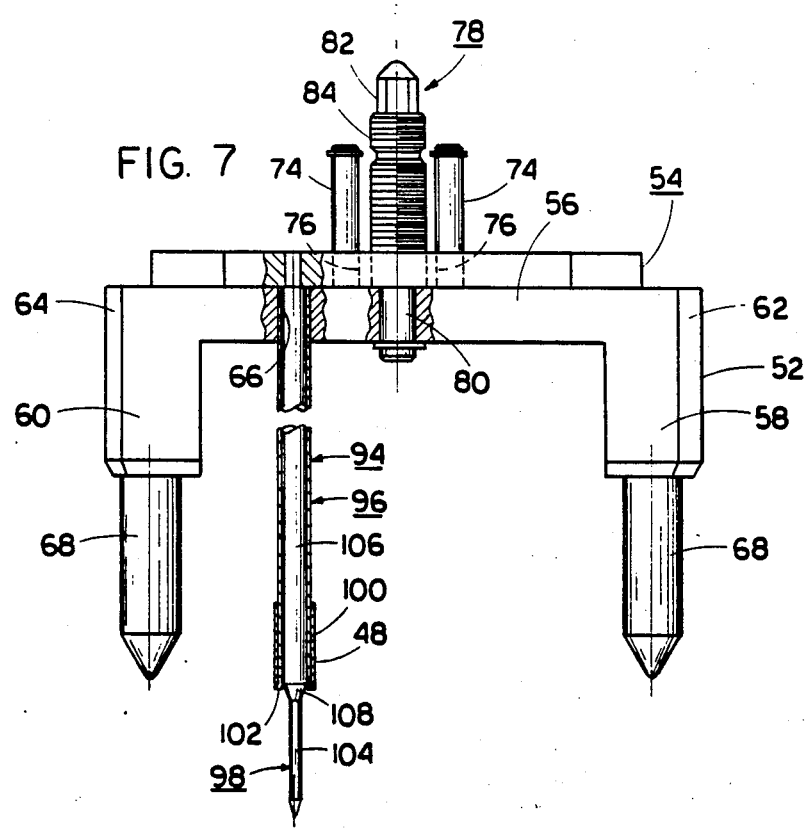

LOCKING TUBE REMOVAL FIXTURE AND METHOD IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly with a Removable Top Nozzle" by John M. Shallenberger et al, assigned U.S. Ser. No. 644,758 and filed Aug. 27, 1984.

2. "Locking Tube Removal and Replacement Tool and Method in a Reconstitutable Fuel Assembly" by John M. Shallenberger et al, assigned U.S. Ser. No. 670,418 and filed Nov. 9, 1984.

3. "Top Nozzle Removal and Replacement Fixture and Method in a Reconstitutable Fuel Assembly" by John M. Shallenberger, assigned U.S. Ser. No. 670,729 and filed Nov. 13, 1984.

4. "Locking Tube Insertion Fixture and Method in a Reconstitutable Fuel Assembly" by John M. Shallenberger, assigned U.S. Ser. No. 689,696 and filed Jan. 8, 1985.

BACKGROUND OF THE INVENTION

1. Field of the Invention

The present invention relates generally to fuel assemblies for nuclear reactors and, more particularly, is concerned with a fixture and method for removing a locking tube from a locking position in a removable top nozzle of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by a plurality of grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expended locking engagement with the annular groove and prevents the inner socket from being moved to a compressed releasing position in which it could be withdrawn from the outer socket. In such manner, the locking tubes maintain the inner sockets in locking engagement with the outer sockets, and thereby the attachment of the top nozzle on the upper ends of the guide thimbles. Furthermore, due to vibration forces and the like, it is desirable to secure the locking tubes in their locking positions. For such purpose, suitable means, such as a pair of bulges, are formed in the upper portion of each locking tube after insertion in its locking position which bulges fit into the circumferential bulge in the upper end portion of the guide thimble.

Prior to removal of the top nozzle from, and after its replacement back on, the fuel assembly, the locking tubes must be removed from and replaced back at their locking positions. One tool for accomplishing either removal or replacement of each locking tube, individually or, in other words, one at a time, is illustrated and described in the second U.S. patent application cross-referenced above. However, it is believed that some customers may perceive the individual handling of locking tubes during reconstitution as posing a risk of tubes escaping and somehow becoming lost in the fuel assembly. This possibility is extremely remote since locking tubes are only handled and transported over a fuel assembly when the nozzle is mounted on the assembly, and no opening through the nozzle or in the annulus between the assemblly and the work station is sufficiently large to allow passage of a dropped locking tube.

Notwithstanding the acceptable performance of the above-mentioned tool in removing and replacing locking tubes and the unlikelihood of losing a locking tube in the fuel assembly when using such tool, the possibility of customer concern over individual locking tube handling coupled with the desire to accomplish removal and replacement of the top nozzle in a shorter period of time have created a need for further improvement of the reconstitution operation so as to enhance commercial acceptance thereof.

SUMMARY OF THE INVENTION

The present invention together with other components, some of which comprise the invention disclosed and claimed in the third and fourth U.S. patent applications cross-referenced above, are designed to satisfy the aforementioned needs by improving a system of remotely-operated, submersible equipment operable to remove and subsequently remount or replace the locking tubes and top nozzle of a reconstitutable fuel assembly, such as the one disclosed in the first U.S. patent application cross-referenced above, at a reactor plant. After the locking tubes and top nozzle have been removed, the upper ends of the fuel rods are exposed from the top of the reconstitutable fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once inspection, removal, replacement and/or rearrangement of the fuel rods is completed, the top nozzle is placed back on the upper ends of the guide thimbles and the locking tubes replaced in their locking positions.

The present invention provides a fixture and method for removing the locking tubes from their locking positions in the removable top nozzle of the constitutable fuel assembly. Furthermore, the locking tubes are handled, in any number ranging from a single one to many, in a captive manner which ensures that none can become lost during removal from their specified position within the fuel assembly. Preferably, the present invention and that of the fourth cross-referenced application respectively make possible the simultaneous removal and insertion of a full complement of locking tubes and accomplish the handling of the tubes so as to preclude their inadvertent escape during reconstitution operations over a fuel assembly in a repair work station. In so doing, a more efficient reconstitution operation with substantially less risk of mishap during handling of the locking tubes is provided.

Accordingly, the present invention sets forth for use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a fixture and method for removing the locking tube from its locking position in the top nozzle.

The fixture for removing the locking tube includes: (a) a tool guide having at least one opening; (b) means for positioning the tool guide on the top nozzle so as to align the opening of the guide with the passageway of the top nozzle adapter plate; (c) a tool holder; (d) means mounting the tool holder on the tool guide for movement between first and second positions relative to the tool guide; and (e) at least one locking tube removal tool.

More particularly, the removal tool includes (i) locking tube engaging means attached to the tool guide within the opening therein, and (ii) elongated actuating means mounted on the tool holder and extending through the tube engaging means. The tube engaging means extends into the upper end portion of the guide thimble in the adapter plate passageway and through the locking tube positioned therein, and is expandable and collapsible into and out of engagement with the locking tube, when the tool guide is disposed on the top nozzle. The actuating means is moved between disengaged and engaged positions relative to the tube engaging means when the tool holder is moved between its first and second positions. Further, the tube engaging means assumes a collapsed position when the actuating means is at its disengaged position and an expanded position when the actuating means is at its engaged position.

Therefore, upon withdrawal of the tool guide and tool holder therewith from the top nozzle with the tool holder being disposed at its second position relative to the tool guide such that the actuating means is disposed at its engaged position and thereby the tube engaging means is disposed at its expanded position, the locking tube is removed by the tool from its locking position in the upper end portion of the guide thimble being located within the adapter plate passageway of the top nozzle.

The method for removing the locking tube includes the operative steps of: (a) disposing a locking tube engaging means within an opening in a tool guide; (b) positioning the tool guide on the top nozzle so as to align its opening with the passageway of the top nozzle adapter plate and extend the locking tube engaging means through the locking tube in the upper end portion of the guide thimble positioned within the passageway; and (c) moving a tool holder having an elongated actuating means mounted thereon and extending through the tube engaging means from a first to a second position so as to move the actuating means from a disengaged to engaged position and thereby the tube engaging means from a collapsed to an expanded position in which the locking tube will be removed from its locking position by the tube engaging means upon withdrawal of the tool guide and the tool holder therewith from the top nozzle.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a fragmentary side elevational view of the upper end of a reconstitutable fuel assembly, with parts partially sectioned and broken away for purposes of clarity, and of the fixture of the present invention employed in removing the locking tubes from the top nozzle of the assembly, with the fixture being shown just after being positioned on the top nozzle.

FIG. 2 is a top plan view of the fixture as seen along line 2—2 of FIG. 1 in the direction of the arrows, showing the tool holder of the fixture.

FIG. 3 is a fragmentary perspective view of the end of one long-handled actuating tool, with portions broken away, for moving the fixture.

FIG. 4 is a fragmentary perspective view of the end of the other long-handled actuating tool, with portions broken away, for moving the tool holder of the fixture relative to the tool guide thereof.

FIG. 7 is a side elevational view, on a reduced scale, of the fixture of FIG. 1, but showing it withdrawn from the top nozzle of the reconstitutable fuel assembly with the removed locking tube retained and captured on its removal tool.

DETAILED DESCRIPTION OF THE INVENTION

Figure 6:
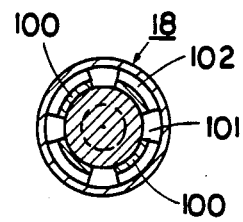
FIG. 6 is a sectional view of the lower end portion of the removal tool as taken along line 6—6 of FIG. 5.

In the following descripton, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an upper end of a reconstitutable fuel assembly, being generally designated by the numeral 10, on which a locking tube removal fixture of the present invention, generally indicated at 12, and a top nozzle removal and replacement fixture (not shown) and a locking tube insertion fixture (not shown), which respectively form the inventions of the third and fourth cross-referenced patent applications, are employed.

Basically, the fuel assembly 10, being of conventional construction, includes an array of fuel rods 14 held in spaced relationship to one another by a number of grids 16 (only one being shown) spaced along the fuel assembly length. Each fuel rod 14 includes nuclear fuel pellets (not shown) and is sealed at its opposite ends. The fuel pellets composed of fissile material are responsible for creating the reactive power of the nuclear reactor core in which the assembly 10 is placed. A liquid moderator/coolant such as water, or water containing boron, is pumped upwardly through the fuel assemblies of the core in order to extract heat generated therein for the production of useful work.

The reconstitutable fuel assembly 10 also includes a number of longitudinally extending guide tubes or thimbles 18 along which the grids 16 are spaced and to which they are attached. The opposite ends of the guide thimbles 18 extend a short distance past the opposite ends of the fuel rods 14 and are attached respectively to a bottom nozzle (not shown) and a top nozzle 20.

To control the fission process, a number of control rods (not shown) are reciprocally movable in the guide thimbles 18 located at predetermined positions in the fuel assembly 10. Specifically, the top nozzle 20 includes a rod cluster control mechanism (not shown) interconnected to the control rods and operable to move the control rods vertically in the guide thimbles 18 to thereby control the fission process in the fuel assembly 10, all in a well-known manner.

As illustrated in FIG. 1, the top nozzle 20 comprises a housing 22 having a lower adapter plate 24 surrounded by four interconnected, upstanding side walls 26 with raised sets of pads 28,30 (only one pad in each set being shown) located respectively at pairs of diagonal corners 32,34 formed by the side walls 26. The control rod guide thimbles 18 have their uppermost end portions 36 coaxially positioned within control rod passageways 38 formed through the adapter plate 24 of the top nozzle 20. For gaining access to the fuel rods 14, the adapter plate 24 of the top nozzle 20 is removably connected to the upper end portions 36 of the guide thimbles 18 by an attaching structure, generally designated 40. The attaching structure 40 will be described herein to the extend necessary to facilitate an understanding of the structure and operation of the locking tube removal fixture 12 comprising the present invention. However a more thorough understanding of the attaching structure 40 can be gained from the first patent application cross-referenced above, the disclosure of which is incorporated herein by reference.

Top Nozzle Attaching Structure

Figure 5:
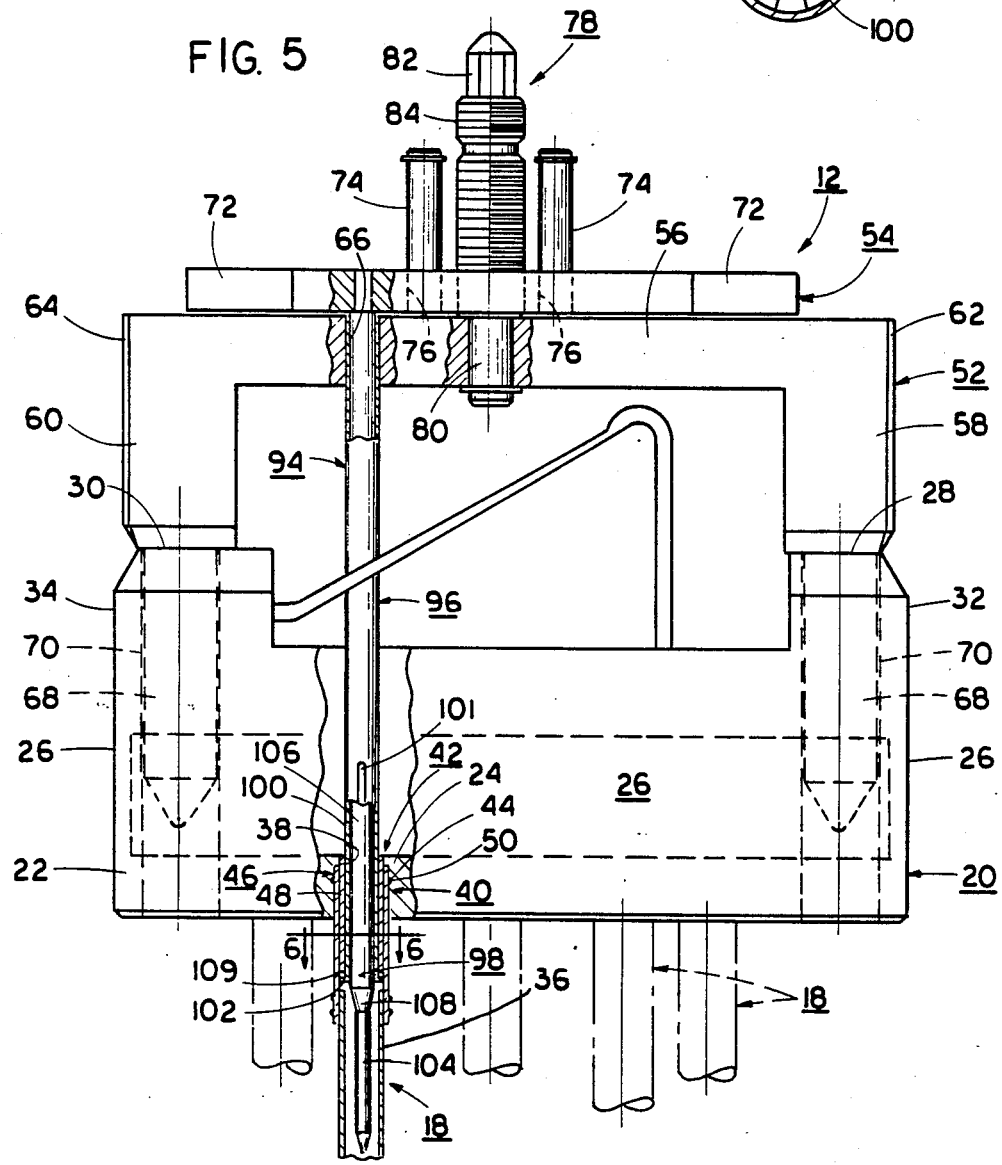
FIG. 5 is a fragmentary side elevational view similar to that of FIG. 1, but showing the fixture after engagement of its removal tool with a locking tube in the top nozzle, but just prior to removal of the locking tube therefrom.

As seen in FIGS. 1 and 5, the attaching structure 40 of the reconstitutable fuel assembly 10 includes a plurality of outer sockets 42 (only one being shown) defined in the top nozzle adapter plate 24 by the plurality of passageways 38 which each contain an annular circumferential groove 44 (only one being shown), a plurality of inner sockets 46 (only one being defined on the upper end portions 36 of the guide thimbles 18, and a plurality of removable locking tubes 48 (only one being shown also) inserted in the inner sockets 46 to maintain them in locking engagement with the outer sockets 42. Each inner socket 46 is defined by an annular circumferential bulge 50 on the hollow upper end portion 36 of one guide thimble 18. A plurality of elongated axial slots (not shown) are formed in the upper end portion 36 of each guide thimble 18 to permit inward elastic collapse of the slotted end portion to a compressed position so as to allow the circumferential bulge 50 thereon to be inserted within and removed from the annular groove 44 via the adapter plate passageway 38. The annular bulge 50 seats in the annular groove 44 when the guide thimble end portion 36 is inserted in the adapter plate passageway 38 and has assumed an expanded position. In such manner, the inner socket 46 of each guide thimble 20 is inserted into and withdrawn from locking engagement with one of the outer sockets 42 of the adapter plate 24.

The locking tubes 48 of the attaching structure 40 are inserted from above the top nozzle 20 into their respective locking positions in the hollow upper end portions 36 of the guide thimbles 18 forming the inner sockets 46. When each locking tube 48 is inserted in its locking position, it retains the bulge 50 of the inner socket 46 in the latter's expanded locking engagement with the annular groove 44 and prevents the inner socket 46 from being moved to its compressed releasing position in which it could be withdrawn from the outer socket 42. In such manner, the locking tubes 48 maintain the inner sockets 46 in locking engagement with the outer sockets 42, and thereby the attachment of the top nozzle 20 on the upper end portions 36 of the guide thimbles 18.

Ordinarily, the locking tubes 48 are dimensioned to have a tight frictional fit with the side-walls of the adapter plate passageways 38 for maintaining the tubes 48 in their locking positions. However, due to vibrational forces and the like, it is sometimes desirable to secure the locking tubes 48 in their locking positions. For such purposes, suitable means, such as a pair of dimples or bulges (not shown), are formed in the upper portion of each locking tube 48 after insertion to its locking position. The bulges fit into the circumferential bulge 50 in the upper end portion 36 of the guide thimble 18.

Fixture for Removing Locking Tubes

For effectuating inspection, removal, replacement and/or rearrangement of fuel rods 14 contained in the reconstitutable fuel assembly 10, the assembly must be removed from the reactor core and lowered into a work station (not shown) by means of a standard fuel assembly handling tool (not shown). In the work station, the fuel assembly is submerged in coolant and thus maintenance operations are performed by manipulation of remotely-controlled submersible equipment. One component of such equipment is the fixture 12 of the present invention for removing the locking tubes 48 as a first step in removing the top nozzle 20 from the reconstitutable fuel assembly 10. Another component of such equipment is the fixture (not shown) forming the invention illustrated and described in the third patent application cross-referenced above which, after the locking tubes 48 have been removed, is used for removing and subsequently replacing the top nozzle 20 from and on the guide thimbles 18 of the reconstitutable fuel assembly 10. Still another component of such equipment is the fixture (not shown) forming the invention illustrated and described in the fourth patent application cross-referenced above for inserting (remounting or replacing) the locking tubes 48 in their locking positions after the top nozzle 20 has been replaced on the fuel assembly 10.

Referring again to FIG. 1, there is shown the fixture 12 useful in removing the locking tubes 48 from their locking positions within the top nozzle 20. The fixture 12 basically includes a tool guide 52 and a tool holder 54 which is moved relative to the guide 52 to prepare for removal of the locking tubes 48.

The tool guide 52 has a thick central plate 56 supported by sets of pedestals 58,60 (only one pedestal in each set being shown) located respectively at pairs of diagonal corners 62,64 (see also FIG. 2) of the central plate 56. The central plate 56 of the tool guide 52 has a generally rectangular configuration and a plurality of openings 66 (only one being shown in FIGS. 1, 5 and 7) defined there-through and arranged in a pattern identical to that of the passageways 38 in the adapter plate 24 of the top nozzle 20. When the tool guide 52 is disposed in its desired position for locking tube removal on the top nozzle 20, its openings 66 are aligned above the respective passageways 38 of the top nozzle 20.

More specifically, for positioning the tool guide 52 on the top nozzle 20 such that the openings 66 of the guide 52 are aligned above the passageways 38 of the adapter plate 24, each of a pair of positioning pins 68 mounted to the pedestals 60 at the diagonal corners 64 of the tool guide are inserted within one of a pair of bores 70 defined in the pair of diagonal raised corner pads 30 of the top nozzle 20.

Turning again to FIG. 1, and also to FIGS. 2, 5 and 7, the tool holder 54 of the fixture 12 has a generally rectangular configuration with notched corners 72. The tool holder 54 is mounted above the tool guide 52 for movement between the upper position of FIG. 1 in which the holder 54 is located remote from the guide 52 and the lower position of FIGS. 5 and 7 in which the holder 54 is located adjacent to the guide 52 by means in the form of a pair of upstanding guide pins 74 stationarily mounted to the central plate 56 of the tool guide 52. The pins 74 extend through a pair of holes 76 defined in the tool holder 54 such that the holder is guided for rectilinear sliding movement in a generally vertical direction along the pins 74 toward and away from the tool guide 52.

The fixture 12 also includes means for moving the tool holder 54 relative to the tool guide 52 between the upper and lower positions of FIGS. 1 and 5 respectively in the form of a central externally threaded shaft 78. The shaft 78, interconnecting the tool guide and holder 52,54, is rotatably coupled at its lower end 80 to the tool guide 52 and threaded into an internally threaded opening 82 in the tool holder 54. Rotation of the threaded shaft 78 in one direction (such as clockwise) will cause the tool holder 54 to move from its upper position remote from the tool guide 52, as seen in FIG. 1, toward the tool guide 52 to the lower position adjacent to the guide, as seen in FIGS. 5 and 7, while rotation in an opposite direction (such as counterclockwise) will cause the tool holder 54 to move away from the tool guide 52 from its lower to upper positions, or from its position in FIG. 5 to its position in FIG. 1.

The central threaded shaft 78 on its upper end has an upper inner hex head 82 and a lower outer threaded head 84. A pair of long-handled tools 86,88 (the end portion of one tool 86 being seen in phantom outline in FIG. 1) are used to engage selected ones of the heads 82,84. Two different female sockets 90,92 on the respective tools 86,88 are illustrated in FIGS. 3 and 4. The socket 90 is internally threaded to engage the threaded head 84 of the central shaft 78, while the socket 92 is hex shaped to engage the hex head 82 of the shaft. The tool 86 is used for installing and lifting the fixture 12 on and from the top nozzle 20. The tool 88 is used for rotating the central shaft 78 to lower and raise the tool holder 54 relative to the tool guide 52.

Finally, referring to FIGS. 1, 5 and 7, the fixture 12 includes a plurality of locking tube removal tools, generally designated 94. Only one of the tools 94 is illustrated in full form in FIGS. 1 and 5, with several others being shown in fragmentary form. However, it is to be understood that this has been done for purpose of clarity only since the other tools are identical to the illustrated one, and thus the illustration of one of the tools 94 will suffice for all. It is to be presumed that in the preferred embodiment of the fixture 12, a full complement of the tools 94 equal in number to that of the locking tubes 48 would most advantageously be used. Further, the tools 94, as depicted in FIG. 2, are arranged in a pattern identical to that of the openings 66 in the tool guide 52.

Each of the locking tube removal tools 94 has a locking tube engaging means in the form of an elongated tubular member 96 being attached to the tool guide 52 in alignment with one of its openings 66 and an elongated actuating means in the form of an elongated shaft 98 being mounted on the tool holder 54 and extending through the one opening 66 of the tool guide 52 and through the tubular member 96 attached thereto. The tubular member 96 extends downwardly from the tool guide 52 and into the upper end portion 36 of a respective one of the guide thimbles 18 in one passageway 38 of the adapter plate 24 when the tool guide 52 is disposed on the top nozzle 20 as seen in FIGS. 1 and 5. The elongated shaft 98 is axially moved within the tubular member 96 upon movement of the tool holder 54 relative to the tool guide 52 between the upper and lower positions as respectively depicted in FIGS. 1 and 5.

The tubular member 96 includes a lower end portion formed in the configuration of a segmented sleeve 100 by a plurality of axially-extending slots 101 (FIG. 6) defined therein. The lower sleeve 100 of the member 96 tapers with a decreasingly smaller diameter than the generally uniform diameter of the upper remaining portion of the member and terminates in an outwardly-turned annular segmented flange or rim 102 formed on the lower end of the sleeve 100. Because of the presence of the slots 101, the segmented sleeve 100 and lower rim 102 are movable between circumferentially-collapsed and circumferentially-expanded positions. In its expanded position, the rim 102 has an outside diameter greater than the inside diameter of each locking tube 48, whereas in the collapsed position the outside diameter of the rim 102 is less than the inside diameter of the locking tube 48.

The elongated shaft 96 includes lower and upper cylindrical portions 104,106 which are merged together by a short tapered shoulder 108. The lower shaft portion 104 has an outside diameter which is smaller than the inside tapered diameter of the segmented sleeve 100 and rim 102 of the tubular member 96. Therefore, the lower shaft portion 104 can readily fit through the lower end portion of the tubular member 96. At the short tapered shoulder 108 of the shaft 98, the outside diameter of the shaft increases to its maximum dimension along the upper shaft portion 106, where it is greater than the inside diameter of the sleeve 100 and rim 102 in their collapsed position. Consequently, when the tool holder 54 is disposed at its upper position of FIG. 1, with the shaft 98 at a disengaged position relative to the tubular member 96, the lower portion 104 of the shaft 98 extends with lateral clearance through the sleeve 100 of the tubular member 96, allowing the same to assume the circumferentially-collapsed position. On the other hand, as the tool holder 54 is moved from its upper position to its lower position of FIGS. 5 and 7, with the shaft 98 moving to an engaged position relative to the tubular member 96, the upper portion 106 of the shaft 98 inserts within the sleeve 100 and rim 102, causing the same to assume the circumferentially-expanded position in which the rim 102 underlies the bottom edge 109 of the locking tube 48.

The procedure for removing the locking tubes 48 is as follows. The long-handled tool 86 is used to position the tool guide 52 with the tool holder 54 and the plurality of tools 94 mounted thereon onto the top nozzle 20 of the reconstitutable feul assembly 10. The tools 94 now extend into the locking tubes 48 disposed in their locking positions in the upper end portions 36 of the guide thimbles 18 locked within the adapter plate passageways 38. The tool 86 is unthreaded from the head 84 of the central shaft 78 and the other tool 88 is inserted on the hex head 82 of the shaft 78. By turning the tool 88, such as clockwise, the tool holder 54 is moved downward toward the tool guide 52 from the upper position of FIG. 1 to the lower position of FIG. 2. Simultaneously therewith, all of the elongated shafts 98 of the tools 94 move axially downward within their respective tubular members 96 of the tools 94, forcing the lower rims 102 on the tubular members outwardly to their expanded positions in which they underlie the lower edges 110 of the locking tubes 48.

The tool 88 is then removed and the other tool 86 is again threaded on the head 84 of the central shaft 78. An upward force is then applied via the tool 88 to the tool guide and holder 52,54, causing upward lifting thereof from the top nozzle 20 and disengagement of the locking tubes 48 from their locking positions within the guide thimble upper end portions 36 as the tool guide 52 is raised off the top nozzle 20. The locking tubes 48 secured to the fixture 12 are transported to a disposal canister (not shown) where the two positioning pins 68 on the tool guide 52 enter mating holes in the canister top flange. With the fixture 12 resting on the canister flange, the tool 86 is removed and the tool 88 is engaged with the hex head 82 on the central shaft 78. By turning the shaft counterclockwise, the tool holder 54 is raised relative to the tool guide 52, which axially moves the shafts 98 upwardly and release the locking tubes 48. The tubes 48 fall into the disposal canister.

It is seen that inadvertent releases of the locking tubes 48 from the removal fixture 12 is precluded during transfer from the fuel assembly 10 in the work station to the disposal canister since the tool holder 54 cannot be raised relative to the tool guide 52 unless the guide is prevented from rotating as is the case when the positioning pins 68 are inserted in the top nozzle bores 70 or in the disposal canister flange holes.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. For use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a fixture for removing the locking tube from its locking position, comprising:
   (a) a tool guide having at least one opening;
   (b) means for positioning said tool guide on said top nozzle so as to align said opening of said guide with said passageway of said top nozzle adapter plate;
   (c) a tool holder;
   (d) means mounting said tool holder on said tool guide for movement between first and second positions relative to said tool guide; and
   (e) at least one locking tube removal tool, said tool including
      (i) locking tube engaging means in the form of an elongated tubular member attached to said tool guide within and in alignment with said opening therein and extending into said guide thimble in said adapter plate passageway and through said locking tube positioned therein when said tool guide is disposed on said top nozzle, said tubular member having a lower end portion being expandable and collapsible into and out of engagement with said locking tube and having a smaller inside diameter than the remainder of said tubular member, and (ii) elongated actuating means in the form of an elongated shaft extending through said tubular member and mounted on said tool holder for axial movement along said tubular member upon movement of said tool holder relative to said tool guide, said shaft including lower and upper cylindrical portions, said lower portion having an outside diameter less than said inside diameter of said lower end portion of said tubular member for allowing insertion of said lower shaft portion therethrough, said upper shaft portion having an outside diameter greater than said inside diameter of said lower end portion of said tubular member, said shaft being moved between disengaged and engaged positions relative to said tubular member when said tool holder is moved between its first and second positions, said upper shaft portion being displaced from said lower end portion of said tubular member for allowing the same to assume a circumferentially-collapsed position when said shaft is at said disengaged position and being inserted within said lower end portion of said tubular member for causing the same to assume a circumferentially-expanded position when said shaft is at said engaged position, whereby upon withdrawal of said tool guide and said tool holder therewith from said top nozzle with said tool holder being disposed at its second position relative to said tool guide such that said shaft is disposed at its engaged position and thereby said lower portion of said tubular member is disposed at its expanded position, said locking tube is removed by said tool from its locking position in said upper end portion of said guide thimble being located within said adapter plate of said top nozzle.

2. The fixture as recited in claim 1, further comprising:
means for moving said tool holder between said first and second positions relative to said tool guide.

3. The fixture as recited in claim 2, wherein said moving means includes:
means interconnecting said tool holder and said tool guide, said means being rotatably mounted to one of said holder and guide and threaded through the other of said holder and guide such that rotation of said means in one direction causes movement of said tool holder from said first position remote from said tool guide toward said second position adjacent to said tool guide, whereas rotation of said means in an opposite direction causes movement of said tool holder from said second position adjacent to said tool guide toward said first position remote from said tool guide.

4. The fixture as recited in claim 3, wherein said interconnecting means is in the form of a threaded shaft.

5. The fixture as recited in claim 1, wherein said positioning means includes a pair of pins mounted respectively in a pair of opposite diagonal corners of said tool guide which are insertable within respective bores defined in a pair of opposite diagonal corners of said top nozzle.

6. The fixture as recited in claim 1, wherein said mounting means includes:
a pair of guide pins stationarily mounted to one of said tool guide and tool holder and mounted to the other of said tool guide and tool holder for relative movement therebetween.

7. The fixture as recited in claim 1, wherein said lower end portion of said tubular member is in the form of an axially segmented sleeve having a smaller diameter than the remainder of said tubular member above said lower end portion thereof and terminating in a lower segmented rim, said rim being disposed below a lower edge of said locking tube when said tool holder is disposed at its second position, said rim being expandable to a first outside diameter greater than an inside diameter of said locking tube and underlying said lower edge of said locking tube when said tool holder is at said second position and said shaft is at its engaged position, said rim being collapsible to a second outside diameter less than said inside diameter of said locking tube and withdrawn from under said lower edge of said locking tube when said tool holder is at said second position and said shaft is at its disengaged position.

8. For use with a reconstitutable fuel assembly including a top nozzle with an adapter plate having a plurality of passageways, a plurality of guide thimbles with upper end portions and an attaching structure having hollow locking tubes for releasably locking the upper end portions of the guide thimbles within the passageways of the top nozzle adapter plate, a fixture for removing the locking tubes from their locking positions, comprising:

(a) a tool guide having a plurality of openings arranged in a pattern identical to that of said passageways in said top nozzle adapter plate;

(b) means for positioning said tool guide on said top nozzle so as to align said openings of said guide above said passageways of said top nozzle adapter plate;

(c) a tool holder;

(d) means mounting said tool holder on said tool guide for movement between first and second positions relative to said tool guide; and (e) a plurality of locking tube removal tools, each of said tools including (i) locking tube engaging means in the form of an elongated tubular member attached to said tool guide in alignment with one of said openings thereof and extending into said upper end portion of one of said guide thimbles in said adapter plate passageways and through said locking tube positioned therein, said tubular member having a lower end portion which is movable between collapsed and expanded positions, and (ii) elongated actuating means in the form of an elongated shaft mounted on said tool holder and extending through said tubular member, said shaft having enlarged means being moved between disengaged and engaged positions relative to said lower end portion of said tubular member when said tool holder is moved between its first and second positions, said lower end portion of said tubular member assuming a collapsed position when said enlarged means of said shaft is at its disengaged position and an expanded position when said enlarged means is at its engaged position, whereby upon withdrawal of said tool guide and said tool holder therewith from said top nozzle with said tool holder being disposed at its second position relative to said tool guide such that said enlarged means of said shaft of each removal tool is disposed at its engaged position and thereby said lower end portion of said tubular member of each removal tool is disposed at its expanded position, said locking tubes are removed by said tools from their locking positions in said upper end portions of said guide thimbles being located within said adapter plate passageways of said top nozzle;

(iii) said lower end portion of said tubular member being in the form of an axially segmented sleeve having a smaller diameter than the remainder of said tubular member and terminating in a lower segmented rim, said rim being expandable to a first outside diameter greater than an inside diameter of said locking tube and to a position underlying a lower edge of said locking tube when said tool holder is at its second position and said enlarged means of said shaft is moved to its engaged position, said rim being collapsible to a second outside diameter less than said inside diameter of said locking tube and to a position withdrawn from said lower edge of said locking tube when said tool holder is at its second position and said enlarged means of said shaft is moved to its disengaged position.

9. The fixture as recited in claim 8, wherein said mounting means includes:

a pair of guide pins stationarily mounted to one of said tool guide and tool holder and mounted to the other of said tool guide and tool holder for relative movement therebetween.

10. The fixture as recited in claim 8, wherein said enlarged portion of said elongated shaft of said each removal tool has an outside diameter greater than said inside diameter of said segmented sleeve and rim of said tubular member, said enlarged shaft portion being displaced from said sleeve to allow said rim to assume said collapsed position when said enlarged shaft portion is at said disengaged position and to be inserted within said sleeve and rim for causing the same to assume said expanded position when said enlarged shaft portion is at said engaged position.

11. For use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a method for removing the locking tube from its locking position, comprising the steps of:

(a) disposing a locking tube engaging means having a lower segmented rim within an opening in a tool guide and extending downward therefrom;

(b) positioning the tool guide on the top nozzle so as to align its opening with the passageway of the top nozzle adapter plate and extend the locking tube engaging means through the locking tube in the upper end portion of the guide thimble positioned within the passageway with the segmented rim of the tube engaging means disposed at a level below a lower edge of the locking tube; and (c) moving a tool holder having an elongated actuating means mounted thereon and extending through the tube engaging means from a first to a second position so as to move the actuating means from a disengaged to an engaged position and thereby the tube engaging means from a collapsed to an expanded position in which its segmented rim is expanded from a position in which it is withdrawn from under the lower edge of the locking tube to a position underlying the lower edge of the locking tube so that the locking tube will be removed from its locking position by the tube engaging means upon withdrawal of the tool guide and the tool holder therewith from the top nozzle.

* * * * *